Dec. 19, 1967   J. J. BUNDSCHUH   3,358,799
SHIFTABLE DRIVE COUPLING
Filed May 12, 1965
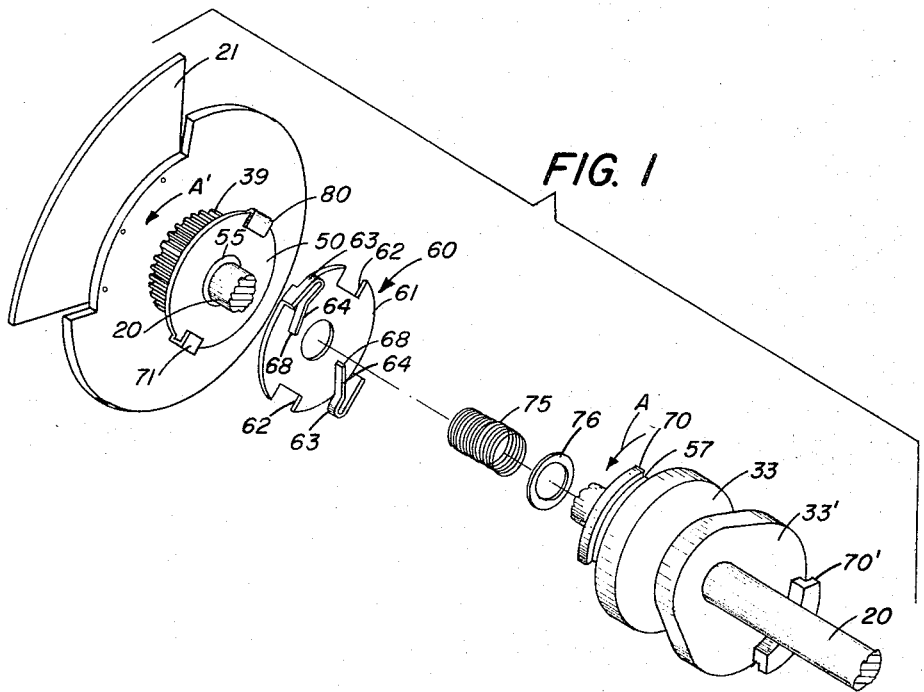
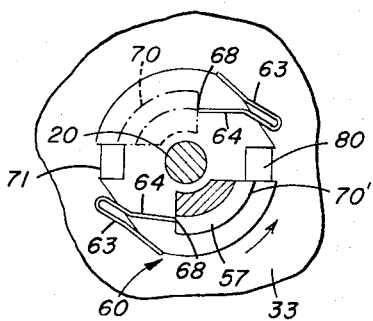
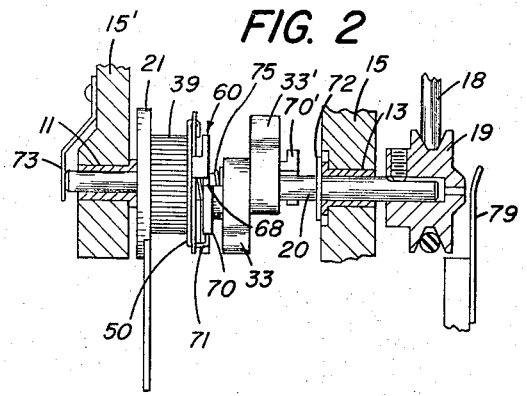
JOHN J. BUNDSCHUH
INVENTOR.
BY
ATTORNEYS United States Patent Office 3,358,799
Patented Dec. 19, 1967

3,358,799
SHIFTABLE DRIVE COUPLING
John J. Bundschuh, Rochester, N.Y., assignor to Eastman Kodak Company, Rochester, N.Y., a corporation of New Jersey
Filed May 12, 1965, Ser. No. 455,222
7 Claims. (Cl. 192—67)

ABSTRACT OF THE DISCLOSURE

This application discloses a shiftable drive coupling which is adapted to selectively connect and disconnect a driving member and a driven member. The driving member has a driving lug fixed theerto which is adapted to be moved axially into the path of rotation of a driven lug fixed to the driven member. A latch member is provided on the driven member to latch the two lugs together to prevent relative rotation thereof and to prevent chattering of the lugs. The latch member is arranged so that the driving and driven members can be axially separated at any time to permit the shafts to be uncoupled. Reference is made to the claims for a legal definition of the invention.

---

The present invention relates to a shiftable drive coupling permitting coaxially arranged drive and driven members to be selectively brought into and disengaged from driving engagement, and particularly to such a coupling having means for eliminating chattering between the parts after they are brought into driving engagement.

It is well known in the art to selectively couple coaxially arranged rotatable driven and driving members by moving a driving lug fixed to the driving member into and out of engagement with a driven lug fixed to the driven member through the axial movement of the lugs relative to one another. Such drive couplings are satisfactory in mechanisms in cases where the drive and driven members rotate at fairly slow speeds, where the coupling is engaged while the members are stationary or rotating at a relatively slow speed, and/or where there is sufficient load on the driven member to prevent it from being momentarily kicked ahead of the drive member as the two parts are brought into engagement. In high speed mechanisms, however, and particularly in mechanisms where the load on the driven member is low, and/or variable, or where the coupling is to be engaged while the drive member is rotating at a high speed relative to the driven member, there is a tendency for the drive and driven lugs to bounce apart due to initial impact between the two when they are first brought into driving engagement. Under certain operating conditions this initial bouncing apart of the drive and driven lugs sets up an oscillation or chattering between the lugs which may persist for some time and causes a noise, and even wear, which is intolerable. This is particularly true if such a drive coupling is used in motion picture projectors because quietness of operation is a prime requisite.

Accordingly, the primary object of the present invention is to provide a shiftable drive coupling for selectively coupling coaxially arranged rotatable driven and driving members which comprises relatively moving a driving lug and a driven lug axially of the members and into and out of engagement with one another, but wherein the lugs after coming into driving engagement with one another are locked together against relative circumferential movement so that there can be no chattering between them.

Another object is to provide a shiftable coupling of the type described which includes a latch means which allows the drive lug to rotate into engagement with the driven lug to drive the same but then positively locks the two lugs against relative rotational movement to eliminate the noise and wear incident to a chattering which might otherwise occur between the lugs.

A further object is to provide a shiftable coupling of the type described which allows the phase relationship between the driving and driven members to be selectively altered when desired without stopping the drive shaft. Such a coupling is particularly adapted for use on the intermittent film feed of motion picture projectors to allow the projector to be reversed without having to change the direction of rotation of, or stopping, the drive shaft of the projector.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

FIG. 1 is an exploded perspective view of a phase shiftable coupling constructed in accordance with a preferred embodiment of the present invention and particularly designed for application to the intermittent film feeding mechanism of a motion picture projector;

FIG. 2 is a horizontal elevational view, partly in section, showing the parts of the coupling in assembled relation and mounted for use; and FIG. 3 is a sectional detail showing the shiftable coupling engaged in one of the two phases of which it is capable.

Generally speaking, the shiftable coupling according to the present invention is adapted to selectively connect and disconnect a driving member and a driven member which are coaxially arranged. The driving member has a driving lug fixed thereto to rotate therewith and which is adapted to be moved into and/or out of the path of rotation of a driven lug fixed to the driven member to rotate therewith when the lugs are moved axially relative to one another. When the driving lug is moved into the path of the driven lug it engages the same and rotates the driven shaft in the same direction and at the same speed as the driving shaft as is well known in the art. With conventional couplings of this type, however, if the driving lug is rotating when the coupling is engaged, then the driving lug strikes the driven lug which is standing still, or is moving slower than the driving lug, there can be, at the moment of impact, a tendency for the driven lug to momentarily bounce away from the driving lug. Immediately thereafter the driving lug again catches up with the driven lug and upon striking it again another bouncing apart of the two might occur but to a lesser extent. Depending upon the speed of rotation of the driving member and the type of load on the driven member this repeated bouncing of the driving and driven lugs may set up an oscillation between the two parts which results in a disturbing chattering and wear incident thereto.

The purpose of the present invention is to prevent this chattering between the driving and driven lugs as the coupling is engaged. To this end I have provided a latch member on the driven member of the coupling which allows the driving lug to move into driving engagement with the driven lug but at the instant the two come into driving engagement they are positively locked together so far as relative rotation is concerned so that chattering between them is eliminated. The latch member is so arranged that the driving and driven lugs can be axially separated at any time to permit the driving and driven members to be uncoupled. For a particular application, e.g., driving the intermittent film feeding mechanism of a motion picture projector, the coupling may be used to merely selectively shift the phase of rotation of the driving and driven shafts rather than to connect and disconnect the drive connection between the driving and driven shafts.

In the drawings I have shown and will describe my novel shiftable coupling as it is designed for use in a motion picture projector to selectively shift the phase of operation of the pull down and in-and-out cams of an intermittent film feeding claw and thereby reverse the film feed without having to stop the drive shaft or change its direction of rotation. An intermittent film feeding mechanism for motion picture projectors using a drive mechanism of the type shown in FIG. 1 is completely described in co-pending U.S. patent application Ser. No. 371,938 filed June 2, 1964 in the name of R. L. Faber et al., which issued on July 19, 1966 as U.S. Patent No. 3,261,654 and which is assigned to the same assignee as the present invention. Reference is made to said patent for a complete understanding as to the structure and operation of a complete projector mechanism of which the shiftable coupling of the present invention may form a part. So far as an understanding of the present invention is concerned it is not necessary to show how the pull down cam driven by the driving member and the in-and-out cam driven by the driven member is connected to the pull down claw to intermittently operate the same since this is fully disclosed in the noted co-pending Faber et al. application. It will suffice to say that the pull down cam is continually driven by the driving member and the pinion driving the in-and-out cam is driven by the driven member, the shiftable coupling of the present invention being used to selectively connect these two members in different phase relationships and in a manner such that there can be no chattering between the driven and driving members. In order to facilitate an understanding of how this drive coupling operates the film claw of a motion picture projector, the parts thereof which correspond to those shown in the noted Faber et al. application are referred to by the same reference numerals.

Referring now to the drawings, a drive member or shaft 20 is slidably and rotatably mounted in bearings 11 and 13 in spaced supporting walls 15 and 15', respectively, of a motion picture projector. This drive shaft 20 is adapted to be continuously rotated in the direction of arrow A by means of a drive belt 18 engaging a pulley 19 fixed to the shaft. In a motion picture projector of the type shown in the noted co-pending Faber et al. application this shaft may be rotated at 54 r.p.s. Fixed to drive shaft 20 is an up-and-down or pull down cam 33 which engages a follower associated with a film pull down claw, not shown, to oscillate the claw up and down at a frequency of 54 r.p.s.

Slidably and rotatably mounted on the drive shaft 20 is a single blade shutter 21, a pinion 39 and a disk 50 having two driven lugs 71 and 80 diametrically disposed on the face thereof. The shutter 21, the pinion 39 and disk 50 are to be driven in unison in the direction of arrow A' by the drive shaft 20, and to this end they can be sweated, or otherwise fixed, to a driven member or bearing 55 in proper orientation to one another so that the drive shaft 20 can rotate as well as move axially relative thereto. The pinion 39 is adapted to drive a gear, not shown, connected to the in-and-out cam of the pull down mechanism, not shown, and the shutter 21 covers the projection aperture, not shown, of the projector during the time the pull down claw is moving the film past the same, all as shown and described in the noted Faber et al. application.

Fixed to the face of the pull-down cam 33 adjacent the shutter 21 is an arcuately shaped drive lug 70. The driving portion of this drive lug is axially spaced from the face of the pull down cam by a groove 57, the bottom of which has a lesser radius than the lug 70. To balance out the effect of this pull down cam 33 on the drive shaft 20 an exact duplicate of this pull down cam and driving lug (33' and 70') is fixed to the shaft 20 immediately adjacent, but oriented 180° with respect to, the pull down cam 33.

Formed from, or otherwise fastened to, the driven disk 50 are a pair of driven lugs 71 and 80 which are diametrically disposed on the face of the disk. It will be observed that the radially in-turned end of lug 71 is spaced further axially from the face of the disk 50 than is the radially in-turned end of lug 80. The difference in this axial separation is slightly greater than the thickness of the driving lug 70 on pull down cam 33 so that when the drive shaft 20 is moved axially toward the disk 50 the driving lug 70 will move into driving engagement with the driven lug 80 and the radial in-turned end of driven lug 71 will pass through the groove 57 to allow this relative rotation between these two parts. On the other hand, when the driving shaft 20 is moved axially to the right relative to disk 50, see FIG. 2, the driving lug 70 will move into the path of driven lug 71 and pick it up to drive the driven parts. It will thus be seen that when the driving lug 70 is driving the driven shaft and pinion 39 fixed thereto through engagement with driven lug 80 the orientation of the pull down cam 33 and the pinion will be 180° out of phase compared to when the driving lug 70 drives the pinion 39 through driven lug 71. In one of these two positions, e.g., when driving lug 70 engages driven lug 71, see FIG. 2, the film feeding mechanism is set for forward projection, whereas when the driving lug 70 engages driven lug 80 the film feeding mechanism is adjusted for reverse operation.

As shown in FIG. 2, the coupling is normally adjusted to a position to produce a forward operation of the film feeding mechanism. To this end the drive shaft is normally urged to the right by a leaf spring 73 fixed to the supporting wall 15' until a washer 72 fixed to the drive shaft engages the bearing 11 in wall 15. In this axial position of the drive shaft 20 the driving lug 70 is in the path of driven lug 71 to drive the driven members by way of engagement therewith. To reverse the film feeding mechanism it is only necessary to press upon the right hand end of drive pulley 19 by means of lever 79 which can be manually moved to the left, looking at FIG. 2, by means not shown to push the drive shaft to the left. This will move drive lug 70 axially from the path of drive lug 71 and into the path of driven lug 80 and thus shift the phase relationship between pinion 39 and pull down cam 33 by 180°. Since as previously mentioned pinion 39 drives the in-and-out cam of the pull down mechanism (not shown) the phase relationship between the in-and-out cam (not shown) and the up-and-down cam 33 is thus shifted 180°. As described in detail in Patent No. 3,261,654 this phase shift is effective to reverse the direction of film advancement by the film feeding mechanism.

The shiftable coupling described up to this point is essentially the same as that shown in the noted co-pending Faber et al. application, and it is the means for overcoming a disadvantage therein that the present invention is concerned. It has been found that this coupling has a tendency to chatter by reason of the fact that the driving lug and driven lugs bounce apart at the instant they come into driving engagement, and this bouncing action between the two lugs has been known to persist for different lengths of time depending upon the speed of operation of the projector and the load conditions imposed on the driven member.

According to the present invention this undesirable chattering between the driving and driven lugs is eliminated by providing the driven disk 50 with a latch member indicated generally at 60, which allows the driving lug 70 and driven lugs 71 and 80 to be readily shifted to and from driving engagement with one another, but which positively locks the driving lug to either driven lug at the instant they move into driving engagement with one another.

This latch member comprises a disk 61 provided with diametrically disposed notches 62 which are adapted to embrace driven lugs 71 and 80 when disk 61 is located against the face of disk 50 and thereby lock the disk 61 to disk 50 to rotate therewith. Attached at one end to the disk 61 at diametrically spaced points are a pair of spring like fingers 63. The free end 64 of each finger 63 extends axially into the path of driven lugs 71 and 80 and will be engaged and depressed by the drive lug 70 as it rotates relative to the driven lugs. As clearly shown in FIG. 3, the spring fingers 63 are so disposed relative to the direction of rotation of driving lug 70 that this lug can rotate relative to the disk 50 and latch member 60 by deflecting the fingers 63 as it engages them. The fingers are so arranged relative to the driven lugs 71 and 80, however, that just as soon as the driving lug 70 engages either of the driven lugs 71 or 80 the associated spring finger 63 snaps behind the driving lug 70 and the extreme end 68 of the finger engages the side of the driving lug opposite that engaging the driven lug and thereby prevents the driving lug and driven lug from bouncing apart and chattering. In FIG. 3 the driving lug 70 is shown engaging driven lug 80 and it will be observed that the extreme end 68 of the spring finger 63 located counterclockwise from lug 80 has snapped behind the drive lug 70 to latch it in engagement with driven lug 80. The dotted line position of drive lug 70 in FIG. 3 shows how it will be latched to driven lug 71 when the coupling is shifted to change the phase relation of the coupling. While the spring fingers 63 will readily flex in a direction substantially radially of the disk 61 to allow the driving lug 70 to pass by the same, once the extreme end 68 of a spring finger 63 drops behind the drive lug 70, see FIG. 3, it is fairly rigid in opposing any force which would result from the driven lug 80 attempting to bounce away from the driving lug 70.

While the spring fingers 63 have been shown as being formed up from the periphery of the disk 61 as the result of a stamping operation and a subsequent bending operation formed on the fingers, it will be obvious they could be separate pieces attached to the face of the disk in any suitable manner. The disk 61 is held against the face of disk 50 by means of a coiled spring 75 encircling shaft 20 and engaging a washer 76 bearing against the face of pull down cam 33. Rather than have the coiled spring 75 hold the disk 61 in place on the face of the disk 50 as shown, disk 61 could be spot welded or otherwise attached to the face of disk 50. Likewise, rather than the spring fingers 73 being mounted on a separate disk 61 as shown, they could be fastened directly to the face of disk 50 in proper orientation with respect to each of the driven lugs 71 and 80.

While the present invention has been shown in combination with a shiftable coupling having two driven lugs so that the phase relationship of the driven and driving shafts can be changed by 180°, it will be obvious that it could be used to the same advantage on a shiftable coupling having only one driven lug. In this instance the coupling would merely serve to selectively connect or disconnect the driving shaft and the driven shaft as the result of axial displacement of the driving and driven lugs relative to one another, but the chattering problem would still be present without the present invention. Furthermore, rather than moving the driving member axially relative to the driven member as shown, the coupling could be shifted by moving the driven member axially relative to the driving member, or by moving both of them axially relative to one another, without going beyond the scope of the present invention.

While I have shown and described certain specific embodiments of my invention I am aware that other modifications thereof are possible. My invention, therefore, is not to be limited to the specific structural details shown and described, but is intended to cover all modifications coming within the scope of the appended claims.

I claim:

1. A shiftable drive coupling comprising: a rotatable drive member; a rotatable driven member supported in coaxial relationship with said drive member; a drive lug connected to said drive member to rotate therewith; a driven lug connected to said driven member to rotate therewith; means for moving at least one of said lugs relative to the other to and from an operative position in which said drive lug upon rotation can drivingly engage said driven lug to couple said drive member to said driven member; and means supported on one of said members for latching said drive lug in engagement with said driven lug to prevent relative rotation thereof while permitting relative movement of at least one of said lugs from said operative position to uncouple said drive member and said driven member.

2. A shiftable drive coupling according to claim 1 wherein the last-named means includes a resilient latch member fixed to said driven member in spaced relation with said driven lug.

3. A shiftable drive coupling according to claim 1 wherein said last-named means includes a spring finger fixed at one end to said driven member and having an inherent bias toward a predetermined latching position, said finger being positioned relative to said driven lug and the path of movement of said drive lug to be engaged and deflected against said bias by said drive lug as it moves toward driving engagement with said driven lug; said finger being positioned to be disengaged by said drive lug when said drive lug engages said driven lug to move under said bias to said predetermined latching position to latch said lugs together.

4. A phase shiftable drive coupling comprising: a drive shaft defining a longitudinal rotational axis; a driven member defining a rotational axis coaxial with the longitudinal axis of said drive shaft and rotatable relative thereto; a drive lug connected to said drive shaft to rotate therewith and having a predetermined width; a pair of driven lugs connected to said driven member to rotate therewith and spaced by a distance greater than said predetermined width of said drive lug, said driven lugs being spaced apart axially relative to said rotational axis to be selectively engaged by said drive lug to establish different phase relationships of said drive shaft and said driven member; means for mounting said lugs whereby said drive lug can be moved axially relative to said driven lugs between a first position, in which said drive lug is adapted to engage one of said driven lugs to connect the two shafts in one phase relation, and a second position, in which said drive lug is adapted to engage the other of said driven lugs to connect the two shafts in a second phase relation; and latching means supported on said driven member for latching said drive lug into engagement with said driven lugs, said latching means being positioned to allow said drive lug to rotate relative to and into engagement with either of said driven lugs and to automatically latch said drive lug in a position of engagement to prevent relative angular movement between said drive lug and the driven lug engaged thereby to prevent chattering of the engaged lugs.

5. A phase shiftable coupling according to claim 4 wherein said driven member is fixed against axial movement and said driven lugs are supported thereon and spaced substantially 180° apart; and wherein said latching means comprises a pair of spring latch members fixed to said driven member in substantially diametrically opposed relation on opposite sides of the rotational axis of said driven member.

6. A shiftable drive coupling comprising: a rotatable drive member defining a rotational axis; a member to be driven rotatable about said axis; a driving lug connected to said drive member for angular movement relative to said axis upon rotation of said driving member; a driven lug connected to said driven member for angular movement relative to said axis to impart rotative movement to said driven member; means for displacing at least one of said lugs to and from an axial position relative to said rotational axis wherein said driving lug drivingly engages said driven lug upon angular displacement of said driving lug relative to said driven lug to thereby establish a driving connection between said members; and locking means responsive to angular displacement of said driving lug into engagement with said driven lug for automatically locking said driving lug in engagement with said driven lug to prevent relative angular displacement of said lugs while permitting relative axial movement of said lugs.

7. A shiftable drive coupling as claimed in claim 6 wherein said locking means comprises a resilient arm supported at an end on said driven member and having an inherent bias toward a locking position, said resilient arm being positioned to be engaged and displaced from said locking position by said driving lug during angular displacement of said driving lug toward engagement with said driven lug and to be disengaged by said driving lug when the latter engages said driven lug to thereby lock said driving lug to said driven lug.

References Cited

UNITED STATES PATENTS

| | | | |
|---|---|---|---|
| 1,196,349 | 8/1916 | Gilbert | 192—67 |
| 1,382,406 | 6/1921 | Beadle | 192—67 |
| 2,314,193 | 3/1943 | Boor et al. | 192—67 |
| 2,816,535 | 12/1957 | Sells | 192—67 |

FRED C. MATTERN, Jr., *Primary Examiner.*

MARK M. NEWMAN, *Examiner.*

C. J. HUSAR, *Assistant Examiner.*